May 24, 1932.  J. L. DRAKE  1,860,084
CAR WINDOW CONSTRUCTION
Filed June 21, 1930  2 Sheets-Sheet 1
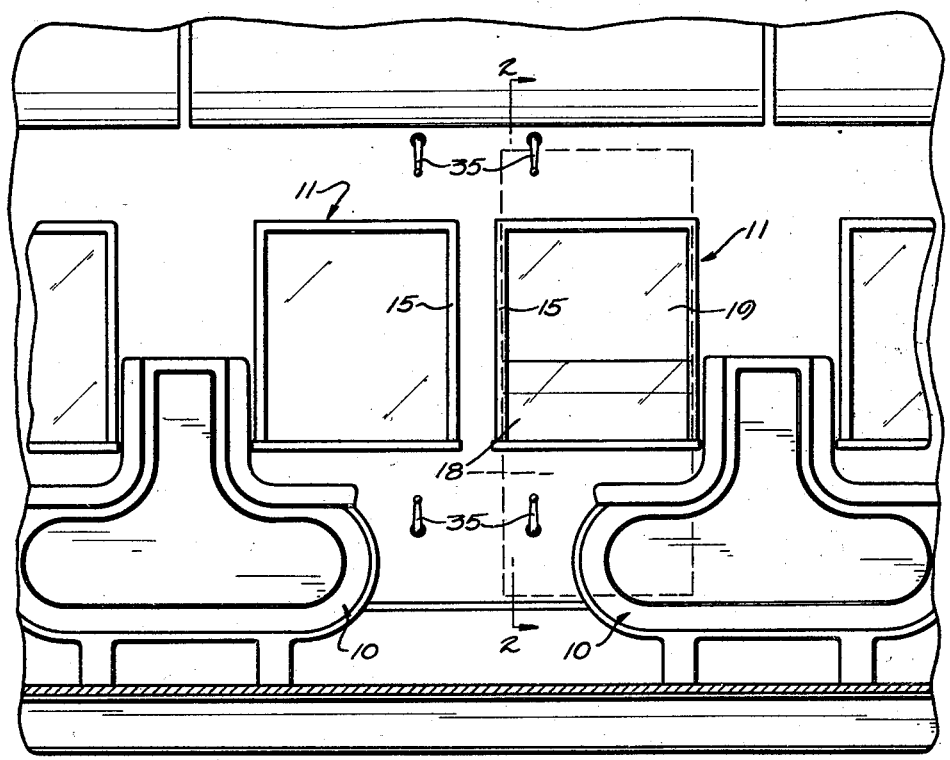
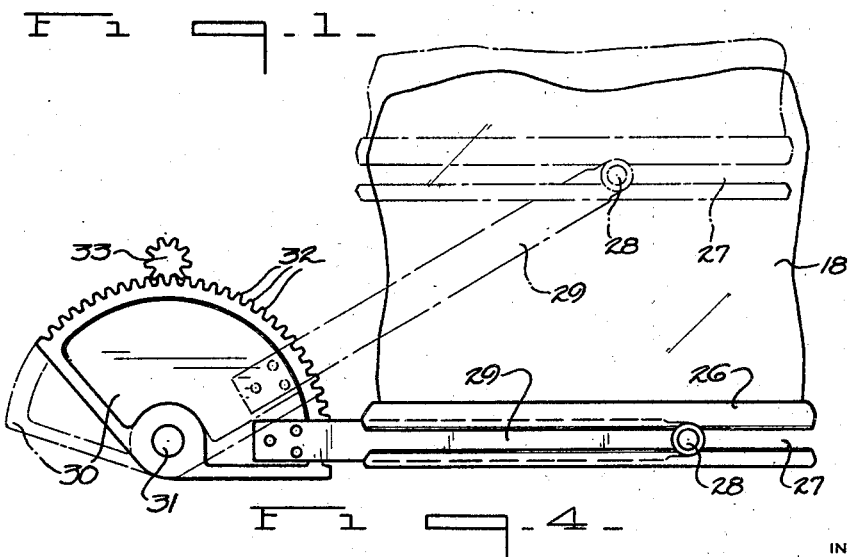
INVENTOR
John L. Drake
Frank Fraser
ATTORNEY

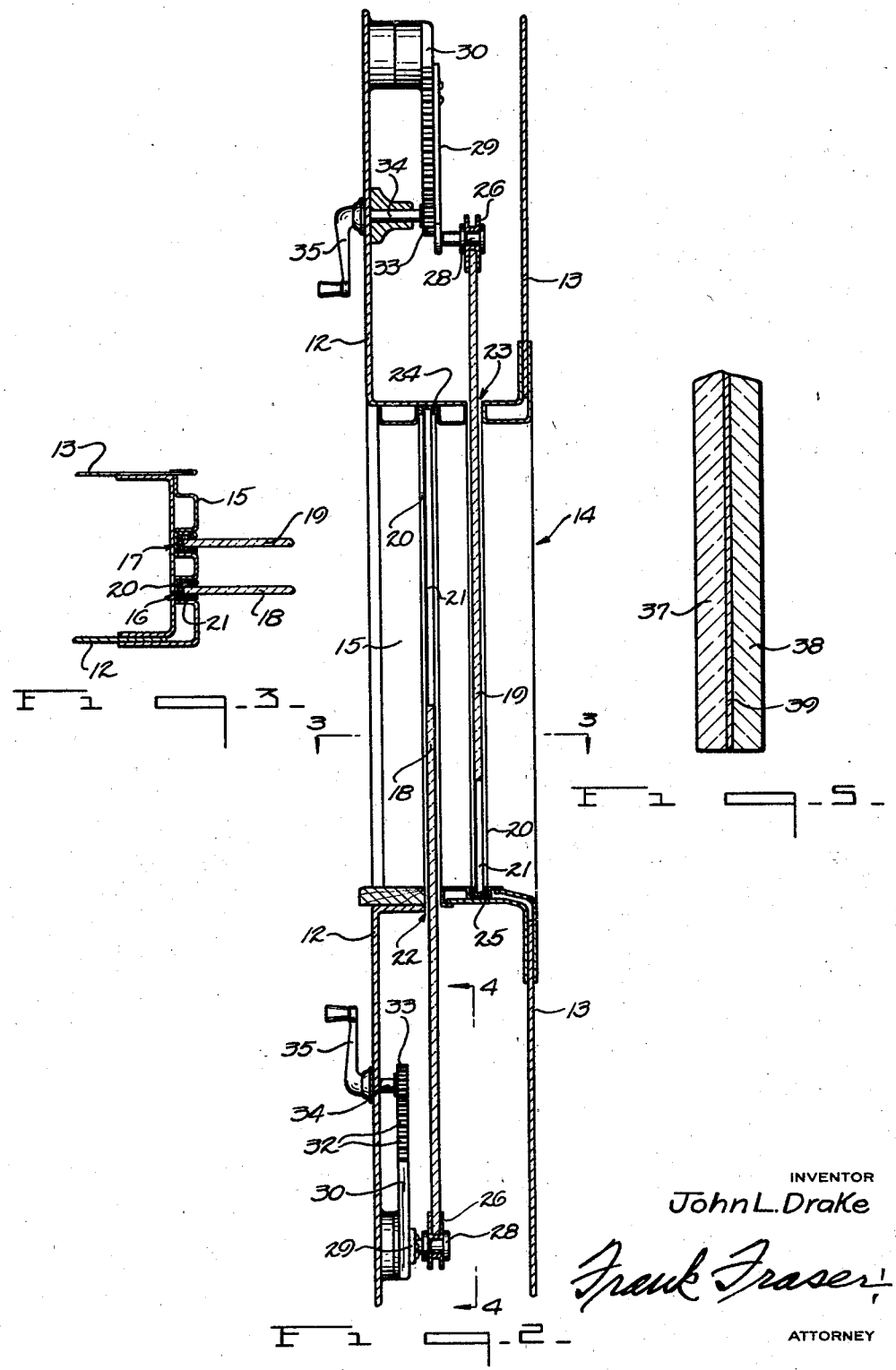

Patented May 24, 1932

1,860,084

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

CAR WINDOW CONSTRUCTION

Application filed June 21, 1930. Serial No. 462,908.

The present invention relates to an improved window construction for railroad passenger cars, street cars, interurban cars, etc.

An important object of the invention resides in the provision of a novel window construction controllable by the occupant of the seat or berth whereby suitable ventilation and ingress of air may be obtained while, at the same time, providing a construction whereby a maximum vision is obtained in a given window opening and also whereby communication and an exchange of articles may be readily carried on between the occupant of the car and an individual on the outside.

Another object of the invention is the provision of a novel window construction embodying a plurality of window lights or panes and wherein said lights can be operated in a manner to give an unobstructed window opening of maximum size or an indirect passage for the circulation of air such as will avoid a direct draft upon the occupant of the seat or berth.

Another object of the invention is the provision of a window construction involving a frame adapted to receive double window lights, namely, an outer light and an inner light, means being provided for independently operating said lights with respect to one another and from the inside of the car.

A further object of the invention is the provision of such a window construction wherein the window lights are slidable in opposite directions relative to one another to opened and closed positions in such a manner as to control the size of the window opening and the ingress of air.

Still another object is the provision of a double window of the above character including means operable from the car interior whereby easy and positive operation of both the inner and outer window lights by the occupant may be had and wherein binding and jamming of the said window lights is obviated.

Other objects and advantages of the invention will become more apparent during the course of the following description when taken in connection with the accompanying drawings.

In the drawings forming a part of this application and wherein like numerals are employed to designate like parts throughout the same, Fig. 1 is an inside elevation of a section of railroad car provided with my improved window construction, Fig. 2 is a vertical section taken substantially on line 2—2 of Fig. 1, Fig. 3 is a transverse section taken substantially on line 3—3 of Fig. 2, Fig. 4 is a view taken substantially on line 4—4 of Fig. 2, showing the window light partially broken away, and Fig. 5 is a sectional view of a different type of glass which may be used with the present invention.

Since the present invention is particularly intended for use in connection with sleeping or Pullman cars, although it is to be fully understood that it is in no way limited to such use, the exemplification discloses a section of a sleeper with the opposing seats being shown at 10—10 in Fig. 1, arranged in the customary manner adjacent to a pair of windows generally indicated at 11—11 in said figure. In Fig. 2, the numerals 12 and 13 represent portions of the inner and outer car walls respectively, spaced apart as usual, and provided with an opening to receive the improved window construction 14 provided by the present invention.

The window construction 14 comprises a frame 15, preferably of metal and inserted within the window opening, said frame being formed to provide spaced vertically disposed grooves or channels 16 and 17 at each side thereof, with the opposed grooves or channels constituting slideways for the inner and outer glass window lights or panes 18 and 19 respectively. Disposed within each groove 16 and 17 is a brass or other metallic retainer 20 containing a strip of felt or like material 21 having a groove within which the adjacent edge of the corresponding window light slides, as will be clearly seen from Fig. 3.

According to this invention, the window lights are movable in opposite directions to open the same, one being preferably raised and the other lowered. Thus, as herein shown, the inner window light 18 is adapted to be lowered to open the same and in order to permit the lowering thereof the frame 15 is provided with a horizontal slot 22 in its bottom through which the said light operates. On the other hand, the window light 19 is adapted to be raised to open the same and therefore, the frame is provided with a similar slot 23 in the top thereof through which this light can operate. When the window lights 18 and 19 are moved to open position, they will be received within the space between the inner and outer side walls 12 and 13 of the car and when moved to closed position, the upper edge of light 18 will abut a grooved strip 24, while the lower edge of light 19 will engage a grooved strip 25, strips 24 and 25 being of a suitable weather-stripping material. Of course, the inner light 18 can be raised when it is desired to open the same and the outer light lowered instead of vice versa, as shown.

The means for actuating the window lights or panes 18 and 19 is best illustrated in Figs. 2 and 4, and since the operating means is the same for each light, a detailed description of only one will be given. Thus, referring particularly to the means for operating the inner window light 18, the said light has secured thereto along its bottom horizontal edge a preferably metallic member 26 having a longitudinally extending slot 27 therein within which is received a roller 28. The roller 28 is carried at the outer end of a bar 29 rigidly secured at its opposite end to a segment 30, supported upon the inside of the inner car wall 12 and adapted to be reciprocated about the point 31. The segment 30 is provided with the usual gear teeth 32 and positioned to mesh therewith is a spur gear 33 carried upon a shaft 34 journaled through the inner side wall 12 of the car and having connected thereto an operating handle or crank 35.

Upon turning of crank 35 to rotate gear 33, it will be readily seen that the segment 30 will be rotated about point 31 to cause either a raising or a lowering of the window 18, dependent upon the direction in which the crank 35 is turned. When the window is partially opened, the various parts of the operating mechanism assume the relative positions indicated by the full lines in Fig. 4. However, upon turning of the crank 35 to move the segment 30 to the left, the member 29 will be swung upwardly as shown by the broken lines and when this is done, roller 28, operating in slot 27, will effect a raising of the window. On the other hand, should the segment be rotated in the opposite direction or to the right, the window will be lowered in a similar manner. Substantially the same operating means is provided for raising and lowering the outer window light 19, with the principal exception that the position of the operating parts including the segment 30, gear 33, etc. is simply reversed.

By the provision of a window construction of the above described character, it will be readily seen that upon turning of the cranks 35, the window lights 18 and 19 can be moved upwardly or downwardly, as preferred, in order to obtain the desired ventilation. Thus, when the inner light 18 is partially lowered and the outer light 19 partially raised, as shown in Fig. 2, so that the lights overlap one another, there will be provided an indirect or tortuous passage for the circulation of air so that the occupant of the car will not be subjected to a direct draft. On the contrary, if the inner light is completely lowered and the outer light completly raised, there will be provided an unobstructed window opening of maximum size.

While the window lights 18 and 19 have been shown in Fig. 2 as consisting of but a single pane of glass, it will be appreciated that so-called laminated or composite glass can be used. This latter type of glass may be found more desirable because of its non-shatterable and non-scatterable qualities. By way of illustration, a sectional view of a piece of glass of this kind has been shown in Fig. 5 and, as is well known, consists generally of two outer sheets of glass 37 and 38 having interposed therebetween a sheet 39 of some suitable non-brittle material, all of said sheets being bonded together to provide a unitary structure.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a car window construction, a frame, and a plurality of window lights carried by said frame and slidable vertically in opposite directions relative to and independently of one another to opened and closed positions.

2. In a car window construction, a frame, a plurality of window lights carried by said frame, means for moving one of said lights upwardly to open the same, and separate means for moving the other light downwardly to open the same.

3. In a car window construction, a frame, and a plurality of window lights carried by said frame and being independently slidable into or entirely out of overlapping relation with respect to one another.

4. In a car window construction, a frame, and a plurality of window lights carried by said frame and being slidable vertically in opposite directions relative to and independently of one another into or out of overlapping relation with respect to one another.

5. In a car window construction, a frame, and a plurality of window lights carried by said frame and movable in opposite directions relative to and independently of one another to form an indirect passage for the circulation of air.

6. In a car window construction, a frame, and a plurality of window lights carried by said frame and slidable vertically in opposite directions relative to and independently of one another to form an indirect passage for the circulation of air.

7. In a car window construction, a frame, and a plurality of window lights carried by said frame and slidable in opposite directions relative to and independently of one another to open and close the same, said window lights, when moved to a partially open position, forming an indirect passage for the circulation of air.

8. In a car window construction, a frame, and a plurality of window lights carried by said frame and independently slidable with respect to one another to form a tortuous passage for the circulation of air.

9. In a car window construction, a frame, and a plurality of window lights carried by said frame and slidable vertically in opposite directions relative to and indepedently of one another to form a tortuous passage for the circulation of air.

10. In a car window construction, a frame having a plurality of vertical slideways, and windows mounted within said slideways and movable vertically in opposite directions relative to and independently of one another to opened and closed positions, said frame having a plurality of slots, one for each window and through which said window operates.

11. In a car window construction, a frame having a plurality of vertical slideways, and windows mounted to slide within said slideways relative to and independently of, said frame having a slot in its bottom through which one window operates and a slot in its top through which a second window operates.

12. In a car window construction, a frame having a plurality of vertical slideways, windows mounted to slide within said slideways, said frame having a slot in its bottom through which one window operates and a slot in its top through which a second window operates, means for moving one of said windows upwardly through the slot in the top of the frame to open the same, and separate means for moving the second window downwardly through the slot in the bottom of the frame to open the same.

13. In a car window construction, a frame having a plurality of vertical slideways, windows mounted to slide within said slideways, said frame having a slot in its bottom through which one window operates and a slot in its top through which a second window operates, and separate means for sliding said windows vertically relative to and independently of one another into or entirely out of overlapping relation with respect to one another, the means for moving each window including a member secured to one edge thereof and having a longitudinally extending slot therein, a segment adapted to be reciprocated about a fixed point, a bar carried by said segment and having a portion thereof received within the slot in said member, and means for reciprocating said segment.

14. In a car window construction, the combination of a wall having spaced inner and outer portions and being also provided with a window opening therein, a frame arranged within said opening and having a plurality of vertical slideways, windows mounted to slide within said slideways, said frame having a slot in its bottom through which one window operates and a slot in its top through which a second window operates, and separate means for sliding said windows relative to and independently of one another into or entirely out of overlapping relation with respect to one another, the means for moving each window including a member secured to one edge thereof and having a longitudinally extending slot therein, a segment positioned between the spaced wall portions and adapted to be reciprocated about a fixed point, a bar carried by the segment and having a portion thereof received within the slot in said member, and a crank having operative connections with said segment for reciprocating the same, said crank extending through the inner wall portion of the car so that it is readily accessible from the interior.

Signed at Toledo, in the county of Lucas and State of Ohio, this 19th day of June, 1930.

JOHN L. DRAKE.

CERTIFICATE OF CORRECTION.

Patent No. 1,860,084.                                    May 24, 1932.

JOHN L. DRAKE.

It is hereby certified that error appears in the printed specification of the above numbered patent requiring correction as follows: Page 3, line 46, claim 11, after the word "of" insert the words one another; and that the said Letters Patent should be read with this correction therein that the same may conform to the record of the case in the Patent Office.

Signed and sealed this 12th day of July, A. D. 1932.

(Seal)                                            M. J. Moore,
                                                Acting Commissioner of Patents.